(12) United States Patent
Okumura et al.

(10) Patent No.: US 10,598,517 B2
(45) Date of Patent: Mar. 24, 2020

(54) ROTARY ENCODER

(71) Applicant: NIDEC SANKYO CORPORATION, Suwa-gun Nagano (JP)

(72) Inventors: Hirokatsu Okumura, Suwa-gun Nagano (JP); Yutaka Saito, Suwa-gun Nagano (JP); Hitoshi Joko, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 216 days.

(21) Appl. No.: 15/895,272

(22) Filed: Feb. 13, 2018

(65) Prior Publication Data

US 2018/0231401 A1 Aug. 16, 2018

(30) Foreign Application Priority Data

Feb. 14, 2017 (JP) ................................ 2017-024878
Feb. 14, 2017 (JP) ................................ 2017-024885

(51) Int. Cl.
*G01D 5/244* (2006.01)
*G01D 5/245* (2006.01)

(52) U.S. Cl.
CPC ....... *G01D 5/24476* (2013.01); *G01D 5/2449* (2013.01); *G01D 5/2451* (2013.01)

(58) Field of Classification Search
CPC .......... G01B 7/003; G01B 7/30; G01D 5/142; G01D 5/145; G01D 5/147; G01D 5/16; G01D 5/165; G01R 33/02; G01R 33/025; G01R 33/09; H02P 6/17; H02P 21/18
USPC ........... 324/207.12, 207.13, 207.25; 702/151
See application file for complete search history.

(56) References Cited

U.S. PATENT DOCUMENTS

| | | | |
|---|---|---|---|
| 2005/0001580 A1* | 1/2005 | Dorner | H02P 6/182 318/653 |
| 2007/0044548 A1* | 3/2007 | Ishizuka | F02D 41/009 73/114.26 |
| 2009/0190903 A1* | 7/2009 | Komatsu | B62D 5/046 388/803 |
| 2014/0125267 A1* | 5/2014 | Suzuki | G01D 5/145 318/400.39 |

FOREIGN PATENT DOCUMENTS

JP 2016099164 A 5/2016

* cited by examiner

*Primary Examiner* — Steven L Yeninas
(74) *Attorney, Agent, or Firm* — Cantor Colburn LLP (57) ABSTRACT

A rotary encoder includes a control part having a storage section storing a plurality of parameters regarding error signal components at a reference rotation speed, the error signal components respectively being superposed on an "A"-phase signal and a "B"-phase signal in proportion to a rotation speed of a rotor body, and a rotation speed calculation section structured to measure a reception interval of a requirement signal and calculate a current rotation speed of the rotor body. The control part is structured to convert a parameter stored in the storage section to a value at the current rotation speed based on a ratio between the reference rotation speed and the current rotation speed, correction processing correcting the "A"-phase signal and the "B"-phase signal is executed based on the value converted, and the rotation position of the rotor body is calculated by using a corrected "A"-phase signal and a corrected "B"-phase signal.

29 Claims, 3 Drawing Sheets

ROTARY ENCODER

CROSS REFERENCE TO RELATED APPLICATION

The present application claims priority under 35 U.S.C. § 119 to Japanese Application No. 2017-024878 filed Feb. 14, 2017, and Japanese Application No. 2017-024885 filed Feb. 14, 2017, the entire contents of which are incorporated herein by reference.

FIELD OF THE INVENTION

At least an embodiment of the present invention may relate to a rotary encoder, especially, to a magnetic type rotary encoder.

BACKGROUND

A magnetic type rotary encoder which utilizes a magneto-sensitive element such as a magneto-resistance effect (MR) element or a Hall element has been known as a device for detecting a rotation position of a rotor body to a fixed body. In the rotary encoder, induced voltage is generated in a wiring line, a circuit and the like due to a change of a magnetic field accompanied with rotation of a rotor body (magnet) and, when the signal component is superposed on an output signal of a magneto-sensitive element, the detection accuracy is deteriorated.

In Japanese Patent Laid-Open No. 2016-99164, a method is disclosed that an error caused by the induced voltage is corrected by utilizing that the induced voltage is superposed on an output signal in proportion to a rotational speed of a rotor body. In this method, a correction amount for cancelling an induced voltage at a specific rotational speed is previously stored and, based on the correction amount and a ratio between the specific rotational speed and a rotational speed in use, a correction value at the rotational speed in use is converted for cancelling the induced voltage. In this manner, a correction value which is increased in proportion to a rotational speed can be converted and calculated from a rotational speed in use and thus a rotation position of the rotor body can be detected with a high degree of accuracy.

However, in the correction method described in the above-mentioned Patent Literature, calculation accuracy of a rotational speed in use is not sufficient and thus calculation accuracy of a correction value for cancelling the induced voltage is not sufficient. As a result, it is difficult to realize a high degree of detection accuracy. Further, an error component which is superposed on an output signal accompanied with rotation of a rotor body cannot be removed and thus it is not sufficient to maintain a high degree of detection accuracy.

SUMMARY

In view of the problem described above, at least an embodiment of the present invention may advantageously provide a rotary encoder which is capable of detecting a rotation position of a rotor body with a high degree of accuracy.

According to at least an embodiment of the present invention, there may be provided a rotary encoder structured to detect a rotation position of a rotor body with respect to a fixed body. The rotary encoder includes a magnet which is provided in one of the fixed body and the rotor body, a magnetic sensor part which is provided in the other of the fixed body and the rotor body and is structured to detect a magnetic field change of the magnet. The magnetic sensor part includes a first magneto-sensitive element which is disposed so as to face a magnetized face of the magnet and is structured to output an "A"-phase signal in a sine wave shape accompanied with rotation of the rotor body, and a second magneto-sensitive element which is disposed so as to face the magnetized face of the magnet and is structured to output a "B"-phase signal in a sine wave shape having a phase difference of 90° to the "A"-phase signal accompanied with rotation of the rotor body. In addition, the rotary encoder includes a control part which is structured to calculate a rotation position of the rotor body based on the "A"-phase signal and the "B"-phase signal when a requirement signal from an outside is received. The control part includes a storage section which stores a plurality of parameters regarding error signal components at a reference rotation speed, the error signal components respectively being superposed on the "A"-phase signal and the "B"-phase signal in proportion to a rotation speed of the rotor body, and a rotation speed calculation section which is structured to measure a reception interval of the requirement signal from the outside and to calculate a current rotation speed of the rotor body based on a rotation displacement amount of the rotor body for a measured reception interval. Further, the control part is structured so that at least one of the plurality of parameters stored in the storage section is converted to a value at the current rotation speed based on a ratio between the reference rotation speed and the current rotation speed calculated in the rotation speed calculation section, correction processing correcting the "A"-phase signal and the "B"-phase signal is executed based on the value converted, and the rotation position of the rotor body is calculated by using the corrected "A"-phase signal and the corrected "B"-phase signal.

According to the rotary encoder, an output signal is corrected by using the converted value of a parameter regarding an error signal component according to a rotation speed and thus a substantially constant output signal without regard to a rotation speed can be obtained and a high degree of detection accuracy is maintained. Further, the control part measures a period for actually calculating a rotation position and thus an accurate rotation speed can be calculated and correction accuracy of the output signal is improved.

In accordance with at least an embodiment of the invention, the error signal component is an induced voltage signal generated in the magnetic sensor part accompanied with rotation of the rotor body, the plurality of the parameters includes an amplitude and a phase of the induced voltage signal, the control part converts only the amplitude of the parameters to a value at the current rotation speed and creates a correction signal which cancels the induced voltage signal based on the converted amplitude and the phase stored in the storage section, and the output signal is corrected by subtracting the correction signal. Alternatively, it may be structured that the control part converts both of the amplitude and the phase of the parameters to values at the current rotation speed and creates a correction signal which cancels the induced voltage signal based on the converted amplitude and the converted phase, and the output signal is corrected by subtracting the correction signal.

In at least an embodiment, the rotor body is rotated at a constant rotation speed as the reference rotation speed and, when a predetermined signal component is subtracted from the "A"-phase signal and the "B"-phase signal to calculate a rotation speed of the rotor body, the amplitude and the phase are set to be those of the predetermined signal component by which a ripple of the calculated rotation speed is minimized. It is difficult to directly separate an induced voltage signal which is superposed on an output signal. However, according to the above-mentioned method, an induced voltage signal which is an error signal component can be easily obtained. Further, in at least an embodiment the reference rotation speed is an instantaneous maximum rotation speed of a motor which is connected with the rotor body. According to this structure, an amplitude and a phase when an induced voltage becomes maximum can be set as the parameters and thus an output signal can be corrected with a high degree of resolution.

Further, the rotary encoder in at least an embodiment of the present invention may include a plurality of magnets and a plurality of magnetic sensor parts, and it may be structured that the control part calculates a rotation position of the rotor body based on a plurality of the "A"-phase signals and a plurality of the "B"-phase signals from the plurality of the magnetic sensor parts and executes correction processing for the plurality of the magnetic sensor parts. In at least an embodiment the plurality of the magnets includes a first magnet in which one "N"-pole and one "S"-pole are disposed in a circumferential direction of the rotor body, and a second magnet in which a plurality of "N"-poles and a plurality of "S"-poles are alternately disposed in the circumferential direction of the rotor body, and the plurality of the magnetic sensor parts includes at least one magnetic sensor part which faces the first magnet and a magnetic sensor part which faces the second magnet. According to this structure, detection accuracy of a rotation position of the rotor body can be improved regardless of a rotation speed.

Further, in at least an embodiment each of the magneto-sensitive elements includes a magneto-resistance effect element. According to this structure, an "A"-phase signal and a "B"-phase signal can be easily obtained from one element.

Further, according to at least an embodiment of the present invention, there may be provided a rotary encoder structured to detect a rotation position of a rotor body with respect to a fixed body. The rotary encoder includes a magnet which is provided in one of the fixed body and the rotor body, and a magnetic sensor part which is provided in the other of the fixed body and the rotor body and is structured to detect a magnetic field change of the magnet. The magnetic sensor part includes a first magneto-sensitive element which is disposed so as to face a magnetized face of the magnet and is structured to output an "A"-phase signal in a sine wave shape accompanied with rotation of the rotor body, and a second magneto-sensitive element which is disposed so as to face the magnetized face of the magnet and is structured to output a "B"-phase signal in a sine wave shape having a phase difference of 90° to the "A"-phase signal accompanied with rotation of the rotor body. The rotary encoder further includes a control part which is structured to calculate a rotation position of the rotor body based on the "A"-phase signal and the "B"-phase signal. The control part includes a storage section which stores a plurality of parameters regarding signal components at a reference rotation speed, the signal components being nonlinearly decreased in the signal components respectively included in the "A"-phase signal and the "B"-phase signal according to increase of a rotation speed of the rotor body, and data which indicate a relationship between a ratio of a rotation speed of the rotor body to the reference rotation speed and a change rate of the plurality of the parameters. The control part further includes a rotation speed calculation section structured to calculate a current rotation speed of the rotor body. The control part converts at least one of the plurality of the parameters stored in the storage section to a value at the current rotation speed based on the ratio of the current rotation speed calculated in the rotation angle calculation section to the reference rotation speed and the change rate of the plurality of the parameters. Further, the control part executes correction processing which corrects the "A"-phase signal and the "B"-phase signal by compensating the decreased signal component based on the converted value and calculates a rotation position of the rotor body by using the corrected "A"-phase signal and the corrected "B"-phase signal.

According to the rotary encoder, an output signal is corrected by using a converted value of a parameter regarding a signal component decreased according to a rotation speed and thus a substantially constant output signal can be obtained without regard to a rotation speed and a high degree of detection accuracy can be maintained.

In at least an embodiment of the invention, the decreased signal component is harmonic components of the "A"-phase signal and the "B"-phase signal, the plurality of the parameters comprises an amplitude and a phase of the harmonic component, the control part converts both of the amplitude and the phase of the plurality of the parameters to values of the current rotation speed, and the decreased signal component is compensated based on the converted amplitude and the converted phase.

In at least an embodiment the rotor body is rotated at a constant rotation speed as the reference rotation speed and, when the rotation speed of the rotor body is calculated by respectively superposing a predetermined signal component on the "A"-phase signal and the "B"-phase signal, the amplitude and phase are set to be those of the predetermined signal component when a ripple of a calculated rotation speed is minimized. According to this method, the decreased signal component can be easily obtained without performing analysis processing such as frequency analysis. Further, in at least an embodiment the reference rotation speed is an instantaneous maximum rotation speed of a motor which is connected with the rotor body. According to this structure, the amplitude and the phase when a change of the decreased signal component to be compensated becomes maximum can be set as parameters and thus an output signal can be corrected with a high degree of resolution. Further, when the amplitude and the phase are calculated by the rotary encoder which is calibrated when the rotor body is rotated at a lower speed than the reference rotation speed, the calculation processing can be simplified. Further, the harmonic component is an eleventh and a thirteenth harmonic components and, in at least an embodiment, each of the magneto-sensitive elements is structured to output the "A"-phase signal and the "B"-phase signal in which a third, a fifth and a seventh harmonic components are canceled. According to this structure, the correction processing is applied to only the eleventh and the thirteenth harmonic components and is not required to be applied to the third, the fifth and the seventh harmonic components and thus arithmetic processing can be simplified.

Further, in at least an embodiment of the invention, a lowpass filter is provided between the magnetic sensor part and the control part. According to this structure, a change rate of the parameter can be obtained easily.

Further, in at least an embodiment the control part calculates the rotation position of the rotor body when the control part receives a requirement signal from an outside. In this case, it may be structured that the rotation speed calculation section measures a reception interval of the requirement signal from the outside and calculates a current rotation speed of the rotor body based on a rotation displacement amount of the rotor body for a measured reception interval. According to this structure, a period is measured at which the control part actually calculates a rotation position and thus an accurate rotational speed can be calculated and the correction accuracy of the output signal is improved. Alternatively, it may be structured that the rotation speed calculation section calculates a current rotation speed of the rotor body based on a rotation displacement amount of the rotor body for a reception interval of the requirement signal previously set between the outside and the control part. According to this structure, arithmetic processing regarding calculation of a rotation speed can be simplified.

Further, the rotary encoder in at least an embodiment of the present invention may include a plurality of magnets and a plurality of magnetic sensor parts, and the plurality of the magnets includes a first magnet in which one "N"-pole and one "S"-pole are disposed in a circumferential direction of the rotor body, and a second magnet in which a plurality of "N"-poles and a plurality of "S"-poles are alternately disposed in the circumferential direction of the rotor body, and the plurality of the magnetic sensor parts includes at least one magnetic sensor part which faces the first magnet and a magnetic sensor part which faces the second magnet. In at least an embodiment the control part calculates a rotation position of the rotor body based on a plurality of the "A"-phase signals and a plurality of the "B"-phase signals from the plurality of the magnetic sensor parts and executes correction processing for the magnetic sensor part corresponding to the second magnet. Specifically, in at least an embodiment the plurality of the magnetic sensor parts includes a first magnetic sensor part and a second magnetic sensor part which are structured to detect a magnetic field change of the first magnet and a third magnetic sensor part structured to detect a magnetic field change of the second magnet, the decreased signal component comprises harmonic components of the "A"-phase signal and the "B"-phase signal which are outputted from the third magnetic sensor part, and the plurality of the parameters comprises an amplitude and a phase of the harmonic component. According to this structure, detection accuracy of a rotation position of the rotor body can be improved without regard to a rotation speed.

Further, in at least an embodiment each of the magneto-sensitive elements includes a magneto-resistance effect element. According to this structure, an "A"-phase signal and a "B"-phase signal can be easily obtained from one element.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the accompanying drawings. A rotary encoder in at least an embodiment of the present invention is an encoder structured to detect a rotation position of a rotor body with respect to a fixed body. In the present specification, at least an embodiment of the present invention describes a rotary encoder in which a magnet is provided in a rotor body and a magnetic sensor part (magneto-sensitive element) is provided in a fixed body as an example. However, a structure of a rotary encoder is not limited to this structure and the structured may be reversed. In other words, at least an embodiment of the present invention may be applied to a rotary encoder in which a magneto-sensitive element is provided in a rotor body and a magnet is provided in a fixed body.

First Embodiment

Figure 1A:
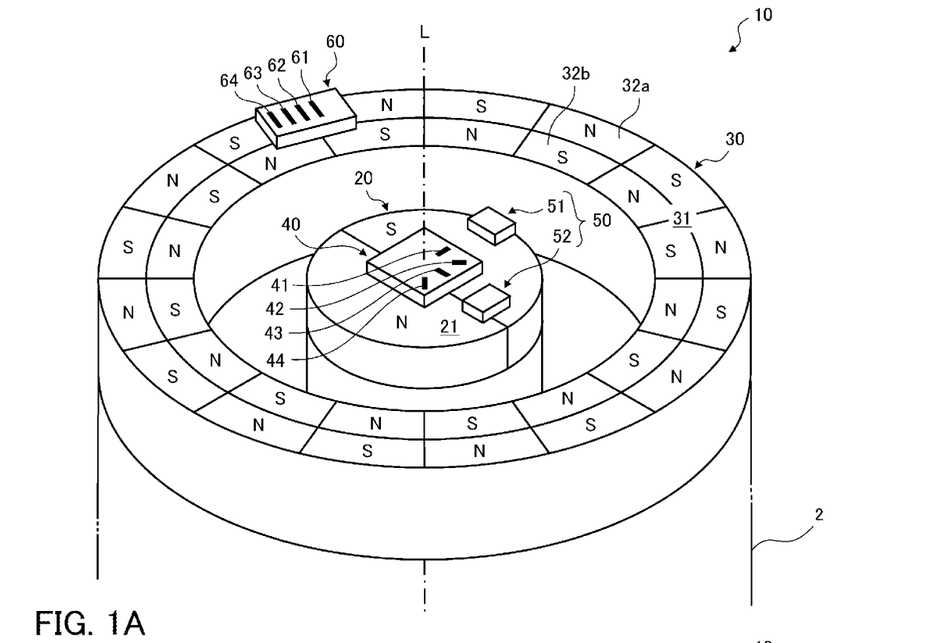
FIG. 1A and FIG. 1B are schematic views showing a structure of a rotary encoder in accordance with a first embodiment of the present invention.
Figure 1B:
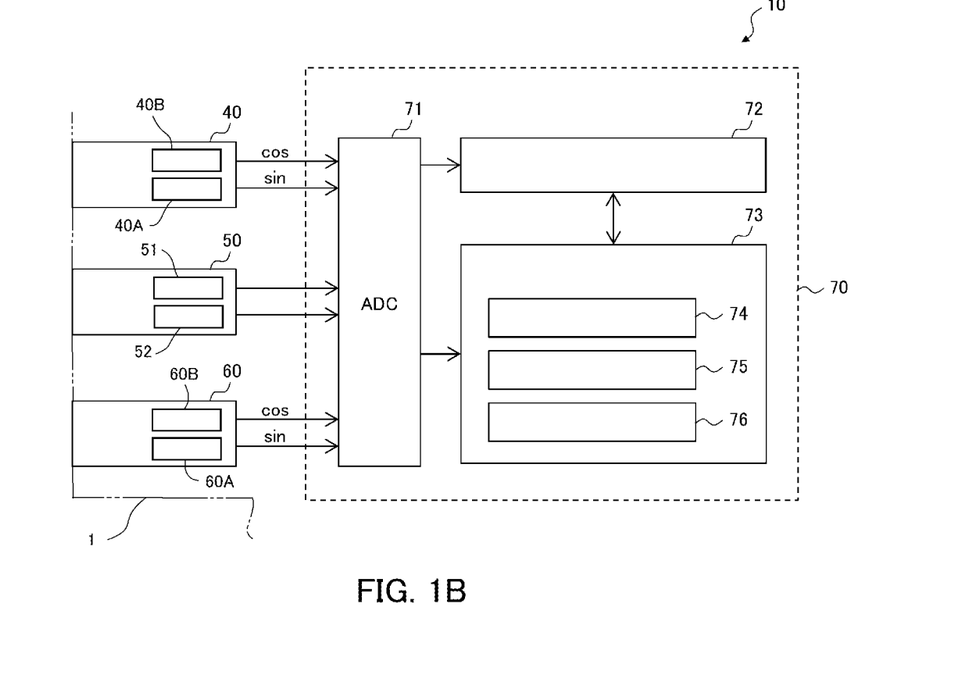

FIG. 1A and FIG. 1B are schematic views showing a structure of a rotary encoder in accordance with a first embodiment of the present invention. FIG. 1A is a schematic perspective view showing a rotary encoder in a first embodiment and FIG. 1B is a block diagram showing the rotary encoder in the first embodiment.

A rotary encoder 10 in the first embodiment includes, as shown in FIG. 1A and FIG. 1B, a first magnet 20, a second magnet 30, a first magnetic sensor part 40, a second magnetic sensor part 50, a third magnetic sensor part 60 and a control part 70. The first magnet 20 and the second magnet 30 are provided in a rotor body 2 which is rotated with a rotation axis "L" as a center and is rotatable together with the rotor body 2. The first magnetic sensor part 40, the second magnetic sensor part 50 and the third magnetic sensor part 60 are provided in a fixed body 1. For example, the rotor body 2 is connected with an output shaft of a motor and the fixed body 1 is fixed to a frame of a motor. The first through the third magnetic sensor parts 40, 50 and 60 are respectively connected with the control part 70 through amplifier circuits (not shown).

The first magnet 20 is structured of a disk-shaped permanent magnet (for example, bond magnet) which is disposed on the rotation axis "L" of the rotor body 2 and whose center is coincided with the rotation axis "L". The first magnet 20 is provided with a magnetized face 21 in which one "N"-pole and one "S"-pole are disposed in a circumferential direction. On the other hand, the second magnet 30 is structured of a cylindrical tube shaped permanent magnet (for example, bond magnet) which is disposed so as to surround an outer side in a radial direction of the first magnet 20 and whose center is coincided with the rotation axis "L". The second magnet 30 is provided with a ring-shaped magnetized face 31 in which a plurality of "N"-poles and a plurality of "S"-poles are alternately disposed in a circumferential direction. The magnetized face 31 of the second magnet 30 is formed with a plurality of tracks 32a and 32b (two tracks in this embodiment) which are disposed so as to be juxtaposed with each other in a radial direction of the rotor body 2. Each of the tracks 32a and 32b is formed with magnetic pole pairs of totaled "n" pieces ("n" is an integer not less than 2, for example, N=64) comprised of an "N"-pole and an "S"-pole along the circumferential direction. Two tracks 32a and 32b which are radially adjacent to each other are disposed so as to be displaced from each other in the circumferential direction and, in this embodiment, two tracks 32a and 32b are disposed so as to be displaced by one pole in the circumferential direction.

The first magnetic sensor part 40 and the second magnetic sensor part 50 are structured to detect magnetic field changes of the first magnet 20 and are respectively disposed so as to face the magnetized face 21 of the first magnet 20. The third magnetic sensor part 60 is structured to detect magnetic field changes of the second magnet 30 and is disposed so as to face the magnetized face 31 of the second magnet 30.

The first magnetic sensor part 40 includes two sensors (magneto-sensitive element) which are structured of four magnetic resistance patterns 41 through 44 each of which is comprised of two magneto-resistance effect (MR) elements. Specifically, the first magnetic sensor part 40 includes an "A"-phase sensor (first magneto-sensitive element) 40A structured to output an "A"-phase signal (sin) in a sine wave shape accompanied with rotation of the rotor body 2, and a "B"-phase sensor (second magneto-sensitive element) 40B structured to output a "B"-phase signal (cos) in a sine wave shape which has a phase difference of 90° to the "A"-phase signal accompanied with rotation of the rotor body 2. The "A"-phase sensor 40A includes a magnetic resistance pattern 43 structured to output a "+a"-phase signal (sin+) in a sine wave shape and a magnetic resistance pattern 41 structured to output a "−a"-phase signal (sin−) in a sine wave shape which has a phase difference of 180° to the "+a"-phase signal. Each of the magnetic resistance patterns 43 and 41 is comprised of two serially-connected MR elements. The two magnetic resistance patterns 43 and 41 are connected in parallel with each other to structure a bridge circuit. The "B"-phase sensor 40B includes a magnetic resistance pattern 44 structured to output a "+b"-phase signal (cos+) in a sine wave shape and a magnetic resistance pattern 42 structured to output a "−b"-phase signal (cos−) in a sine wave shape which has a phase difference of 180° to the "+b"-phase signal. Each of the magnetic resistance patterns 44 and 42 is comprised of two serially-connected MR elements. Similarly to the "A"-phase sensor 40A, the two magnetic resistance patterns 44 and 42 are connected in parallel with each other to structure a bridge circuit.

The second magnetic sensor part 50 includes a first Hall element 51 and a second Hall element 52 which is disposed at a position separated from the first Hall element 51 by 90° with the rotation axis "L" as a center.

The third magnetic sensor part 60 includes two sensors (magneto-sensitive element) structured of four magnetic resistance patterns 61 through 64 each of which is comprised of two MR elements. Specifically, the third magnetic sensor part 60 includes an "A"-phase sensor (first magneto-sensitive element) 60A structured to output an "A"-phase signal (sin) in a sine wave shape accompanied with rotation of the rotor body 2, and a "B"-phase sensor (second magneto-sensitive element) 60B structured to output a "B"-phase signal (cos) in a sine wave shape which has a phase difference of 90° to the "A"-phase signal accompanied with rotation of the rotor body 2. The "A"-phase sensor 60A includes a magnetic resistance pattern 64 structured to output a "+a"-phase signal (sin+) in a sine wave shape and a magnetic resistance pattern 62 structured to output a "−a"-phase signal (sin−) in a sine wave shape which has a phase difference of 180° to the "+a"-phase signal. Each of the magnetic resistance patterns 64 and 62 is comprised of two serially-connected MR elements. The two magnetic resistance patterns 64 and 62 are connected in parallel with each other to structure a bridge circuit. The "B"-phase sensor 60B includes a magnetic resistance pattern 63 structured to output a "+b"-phase signal (cos+) in a sine wave shape and a magnetic resistance pattern 61 structured to output a "−b"-phase signal (cos−) in a sine wave shape which has a phase difference of 180° to the "+b"-phase signal. Each of the magnetic resistance patterns 63 and 61 is comprised of two serially-connected MR elements. The two magnetic resistance patterns 63 and 61 are connected in parallel with each other to structure a bridge circuit.

A control part 70 is structured by using a microcomputer which includes a central processing unit (CPU), a random-access memory (RAM), a read-only memory (ROM) and the like. The control part 70 calculates a rotation position (absolute angle position) of the rotor body 2 based on the output signals outputted from the first through the third magnetic sensor parts 40, 50 and 60.

Figure 2A:
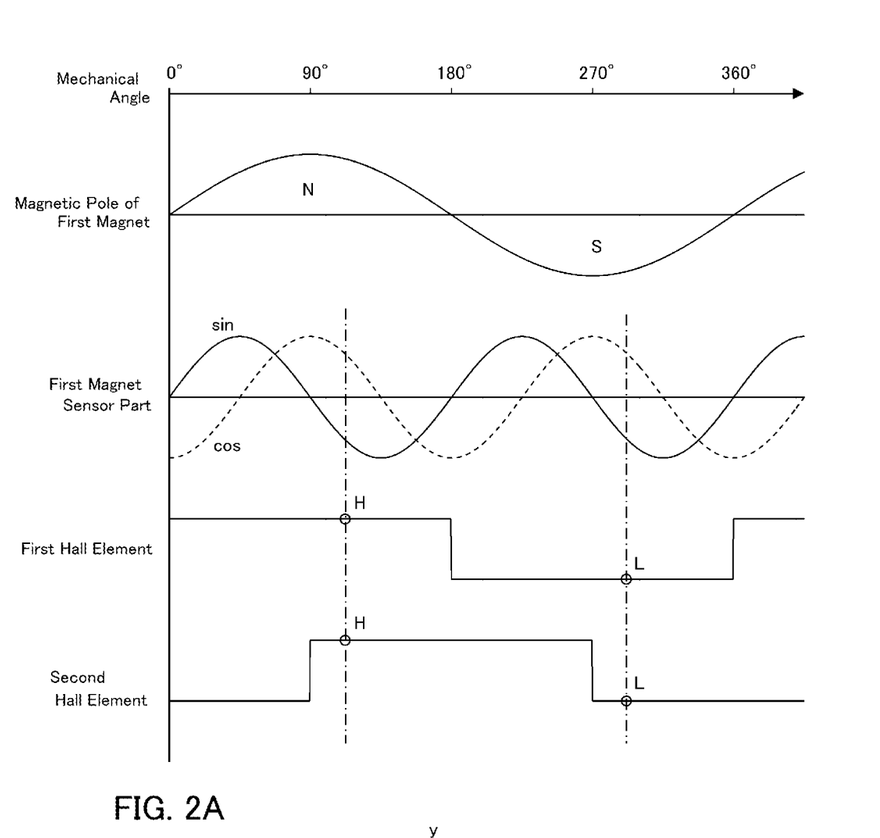
FIG. 2A and FIG. 2B are explanatory views showing a detection principle for an absolute angle position of a rotor body in a rotary encoder in accordance with the first embodiment of the present invention.
Figure 2B:
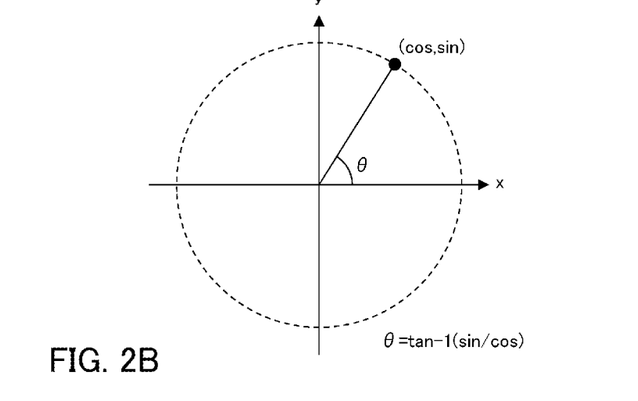

Next, a detection principle for an absolute angle position of the rotor body 2 in this embodiment will be described below with reference to FIG. 2A and FIG. 2B. FIG. 2A shows, with respect to change of a mechanical angle of the rotor body 2 from a specific reference position, a magnetic pole and an intensity of the first magnet 20, an output signal from the first magnetic sensor part 40, an output signal from the first Hall element 51, and an output signal from the second Hall element 52. FIG. 2B shows a relationship between the output signal and an electrical angle θ. A mechanical angle indicates a geometrically or mechanically determined angle and an electrical angle indicates an angle determined by a phase of an output signal from a magneto-sensitive element. In FIG. 2A, output signals from the first and the second Hall elements 51 and 52 are indicated by a binary signal of "H" or "L" obtained through a comparator.

When the rotor body 2 rotates by a single turn, the first magnet 20 also rotates once (360° rotation in a mechanical angle). Therefore, as shown in FIG. 2A, an "A"-phase signal (sin) and a "B"-phase signal (cos) are respectively outputted from the first magnetic sensor part 40 by two cycles, in other words, for 720° in an electrical angle (angle determined by a phase of an output signal). An electrical angle θ is calculated by a relational expression of "θ=tan-1(sin/cos)" based on the "A"-phase signal and the "B"-phase signal as shown in FIG. 2B. However, the rotor body 2 rotates 720° in an electrical angle when the rotor body 2 rotates 360° in a mechanical angle and thus, an absolute angle position of the rotor body 2 cannot be obtained merely by calculation of the electrical angle θ. Therefore, two Hall elements 51 and 52 are utilized which are disposed at positions separated by 90° from each other with the rotation axis "L" as a center. In other words, a polarity of the magnetic field generated from the first magnet 20 is determined based on the output signals which are outputted from the two Hall elements 51 and 52. As a result, as shown by the alternate long and short dash line in FIG. 2A, it is determined which quadrant a rotation position in a mechanical angle is located in a plane coordinate system. In this manner, an absolute angle position of the rotor body 2 can be calculated.

On the other hand, each time the rotor body 2 rotates by one pair of magnetic poles in a circumferential direction of the second magnet 30, similarly to the case shown in FIG. 2A, the third magnetic sensor part 60 outputs an "A"-phase signal (sin) of two cycles and a "B"-phase signal (cos) of two cycles (in other words, for 720° in an electrical angle). Therefore, based on the "A"-phase signal and the "B"-phase signal outputted from the third magnetic sensor part 60, an absolute angle position of the rotor body 2 is also calculated in an angle corresponding to one pair of the magnetic poles of the second magnet 30 by the similar principle for the first magnetic sensor part 40 described above. A detection resolution of an absolute angle position by the third magnetic sensor part 60 is higher than that by the first magnetic sensor part 40. Therefore, an absolute angle position of the rotor body 2 can be calculated with a high degree of resolution by combining these results.

In the rotary encoder 10 in this embodiment, an induced voltage is generated in a wiring line, a circuit or the like due to magnetic field change accompanied with rotation of the rotor body 2 and a signal component of the induced voltage is superposed on an output signal from the magneto-sensitive element. For example, in one rotation period of the rotor body 2, an induced voltage signal of the same one period in a sine wave shape is superposed on the "A"-phase signal and the "B"-phase signal respectively in the first magnetic sensor part 40. Further, in a case that the "n" pieces ("n" is an integer not less than 2, for example, N=64) of magnetic pole pairs are formed in the third magnetic sensor part 60 in its circumferential direction, induced voltage signals in sine wave shapes of two types of "n" cycles and "2n" cycles are superposed per one rotation period of the rotor body 2. Such the induced voltage signals appear as periodic components when converted into a rotation position of the rotor body 2. In other words, when a rotation angle calculated based on output signals including induced voltage signals is plotted with respect to the actual rotation angle, the rotation angle is indicated as cyclic swells with respect to the ideal straight line. Regarding the cyclic swells, the present inventors have confirmed that these cycles are 1 (one) time and 3 (three) times with respect to one rotation period of the rotor body 2 in the first magnetic sensor part 40 and, in a case that "n" pieces ("n" is an integer not less than 2, for example, N=64) of magnetic pole pairs are formed in the third magnetic sensor part 60 in its circumferential direction, these cycles are "n" times, "3n" times and "4n" times. When a rotation speed of the rotor body 2 is increased, the induced voltage signal is superposed on the output signal while its amplitude becomes large in proportion to the speed with the substantially same phase. Therefore, the detection error increases accompanied with increase of the rotation speed of the rotor body 2.

In this embodiment, in order to maintain stable detection accuracy regardless of a rotation speed of the rotor body 2, the control part 70 has a function which corrects errors due to induced voltage signals superposed on output signals from the respective magnetic sensor parts 40, 50 and 60 in proportion to the rotation speed. Specifically, the control part 70 stores parameters regarding induced voltage signals (error signal components) at a reference rotation speed for output signals from the respective magnetic sensor parts 40, 50 and 60. Based on a ratio between the reference rotation speed and a current rotation speed, the parameters are converted into values for the current rotation speed and the output signals are corrected based on the converted values. In this manner, when the component of the induced voltage signal (error signal component) proportional to the rotation speed is subtracted, the substantially constant output signal which is not dependent on the rotation speed can be obtained and a high degree of detection accuracy can be maintained.

Next, a functional structure of the control part 70 will be described below by mainly paying attention to the correction processing function with reference to FIG. 1B.

The control part 70 includes an AD conversion section (ADC) 71, an angle calculation section 72 and a correction processing section 73. The correction processing section 73 includes a storage section 74, a communication period measuring section 75 and a rotational speed calculation section 76.

The ADC 71 converts analog signals outputted from the first through the third magnetic sensor parts 40, 50 and 60 into digital signals to output to the angle calculation section 72 and the correction processing section 73. The angle calculation section 72 calculates a rotation position of the rotor body 2 described above based on the output signals from the first through the third magnetic sensor parts 40, 50 and 60 converted into digital signals in the ADC 71. In this case, the angle calculation section 72 acquires correction information for canceling the induced voltage signals (error signal component) superposed on the respective output signals of the first through the third magnetic sensor parts 40, 50 and 60 from the correction processing section 73. Next, the angle calculation section 72 corrects the output signals based on the acquired correction information and calculates a rotation position of the rotor body by using the corrected output signals based on the calculation method described above.

The correction processing section 73 converts the parameters stored in the storage section 74 regarding induced voltage signals (error signal component) at the reference rotation speed into values at a current rotation speed based on a ratio between the reference rotation speed and the current rotation speed calculated by the rotational speed calculation section 76.

The storage section 74 stores the parameters regarding the induced voltage signals (error signal component) at the reference rotation speed, specifically, stores amplitudes and phases of the induced voltage signals as the parameters. In this case, although an amplitude of the induced voltage signal is varied according to a rotation speed, a phase is substantially constant regardless of the rotation speed. Therefore, when correction processing is to be performed, the phase at the reference rotation speed stored in the storage section 74 is sent to the angle calculation section 72 as it is, but the amplitude is converted in the correction processing section 73 into an amplitude at the current rotation speed and then is sent to the angle calculation section 72. Next, in the angle calculation section 72, a correction signal for cancelling the induced voltage signal is created by using the amplitude converted in the correction processing section 73 and the phase sent from the storage section 74 and then, the output signal is corrected by subtracting the correction signal. In this embodiment, the value of the phase of the induced voltage signal stored in the storage section 74 is sent to the angle calculation section 72 as it is, assuming that the phase is substantially constant regardless of the rotation speed. However, the phase may be converted similarly to the amplitude assuming that the phase is varied according to the rotation speed.

The communication period measuring section 75 measures a communication period between a host control device (not shown) provided in an outside of the rotary encoder 10 and the control part 70. For example, the control part 70 is structured to calculate a rotation speed of the rotor body 2 when a requirement signal from the host control device is received. In this case, the communication period measuring section 75 measures a time when the control part 70 receives the requirement signal and measures a reception interval of the requirement signal from the time.

The rotational speed calculation section 76 calculates a rotation displacement amount of the rotor body in a predetermined time interval based on the reception interval measured by the communication period measuring section 75 and information of the rotation position of the rotor body 2 acquired from the angle calculation section 72 and then calculates the current rotation speed of the rotor body 2 by using the rotation displacement amount. In this case, since a period where the control part 70 receives the requirement signal from the host control device is set in advance, a rotation speed may be calculated by using the previously set value for simplifying a calculation processing as described in the above-mentioned Patent Literature. However, when an actual communication period is varied, it is difficult to calculate an accurate rotation speed and, as a result, it is difficult to maintain the correction accuracy. On the other hand, according to this embodiment, since the control part 70 measures a period for actually calculating a rotation position, an accurate rotation speed can be calculated and, as a result, the correction accuracy in the correction processing section 73 can be improved.

Setting of the parameters stored in the storage section 74 are performed as described below before the rotary encoder 10 is shipped from a factory. First, a motor which is connected with a rotor body 2 is rotated at a constant rotation speed. In this case, since the rotation speed is constant, when an output signal includes an error, ripples appear in the calculated rotation speed of the rotor body 2 but, when the output signal is ideal without an error, the ripples do not appear. Therefore, the rotation speed of the rotor body 2 is calculated by respectively subtracting predetermined signal components from the "A"-phase signal and the "B"-phase signal on which induced voltage signals are superposed. The amplitude and the phase of the predetermined signal component are adjusted to the optimum value so as to cancel the induced voltage signal and the ripples of the calculated rotation speed are minimized. The amplitude and the phase obtained in this way are set as parameters. It is difficult to directly separate an induced voltage signal from the output signal. However, according to this method, the induced voltage signal which is an error signal component can be easily obtained. In accordance with an embodiment of the present invention, instead of subtracting a predetermined signal component, it may be structured that signal components whose phases when ripples of the calculated rotation speed are minimized are inverted are set as parameters and that the predetermined signal components are respectively superimposed on an outputted "A"-phase signal and an outputted "B"-phase signal.

As described above, also in a case that a rotation position of the rotor body 2 is calculated, a periodic error component appears and thus the amplitude and the phase of a predetermined signal component may be adjusted so that the error component is minimized. However, the arithmetic processing is complicated and, in addition, when a frequency of an error component becomes high, an extremely high sampling frequency is required for suppressing aliasing and thus the number of sampling points may be extremely large. Therefore, practically, parameters may be set by using a method in which a rotation speed is calculated. Further, in at least an embodiment a rotation speed of the motor when parameters are to be set is an instantaneous maximum rotation speed (for example, 6000 rpm). As a result, the amplitude and the phase when the induced voltage becomes maximum can be set as parameters, and the output signal can be corrected with a high degree of resolution.

Second Embodiment

Figure 3A:
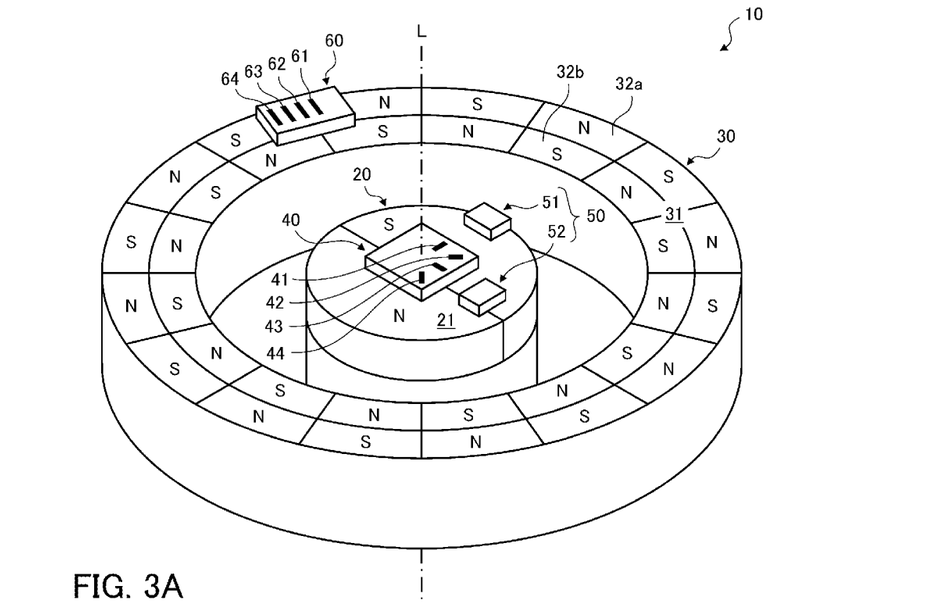
FIG. 3A and FIG. 3B are schematic views showing a structure of a rotary encoder in accordance with a second embodiment of the present invention.
Figure 3B:
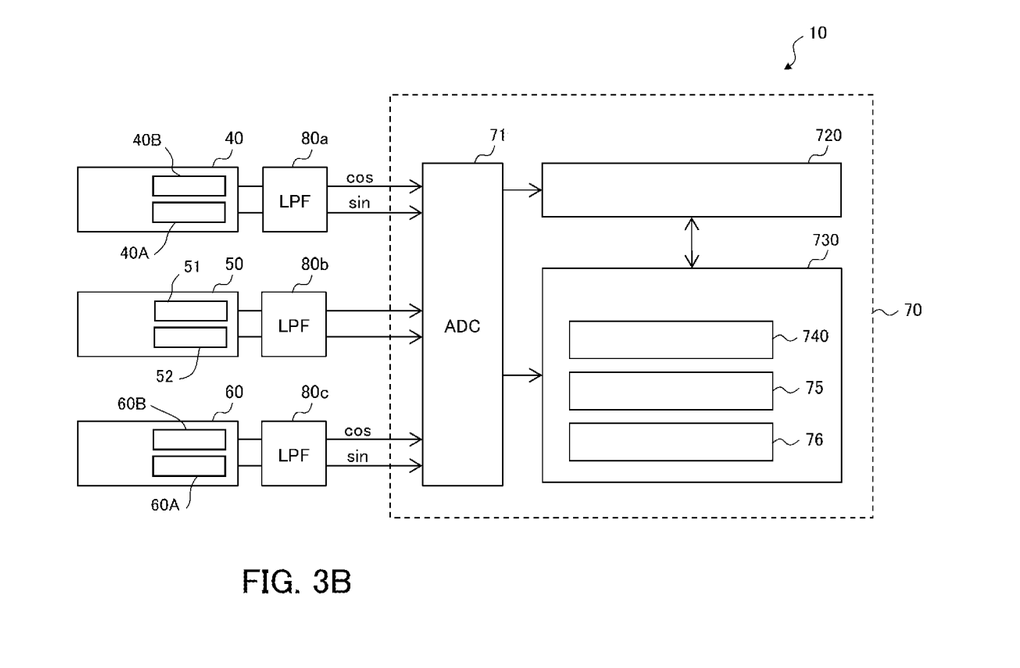

FIG. 3A and FIG. 3B are schematic views showing a structure of a rotary encoder 10 in accordance with a second embodiment of the present invention. FIG. 3A is a schematic perspective view showing a rotary encoder 10 in a second embodiment and FIG. 3B is a block diagram showing the rotary encoder 10 in the second embodiment. A schematic structure of the rotary encoder 10 shown in FIG. 3A is the same as that in the first embodiment described above and thus its explanation is omitted.

In the rotary encoder 10 in the second embodiment, as shown in FIG. 3B, analog lowpass filters (LPF) 80*a*, 80*b* and 80*c* are provided between an ADC 71 of a control part 70 and respective magnetic sensor parts 40, 50 and 60. Harmonic components are included in output signals from the respective magnetic sensor parts 40, 50 and 60. The present inventors have confirmed that respective harmonic components of an "A"-phase signal and a "B"-phase signal especially from the third magnetic sensor part 60 are decreased by the LPFs 80*a*, 80*b* and 80*c* according to a rotation speed of the rotor body 2. Specifically, it is confirmed that amplitudes of an eleventh and a thirteenth harmonic components of an "A"-phase signal of the third magnetic sensor part 60 and amplitudes of an eleventh and a thirteenth harmonic components of its "B"-phase signal are nonlinearly decreased accompanied with increase of the rotation speed so as to correspond to a gain-frequency characteristic of the LPF 80*c*. Lissajous waveforms (see the broken line in FIG. 2B) calculated by the "A"-phase signal and the "B"-phase signal obtained in this case become close to a circular shape from a dodecagonal shape when the eleventh and the thirteenth harmonic components are included. Therefore, these harmonic components may be attenuated. However, in this embodiment, calibration of the rotary encoder 10 for removing a design error, an assembling error and the like is performed by rotating the rotor body 2 at an extremely low speed (for example, 60 rpm) immediately after manufacture. Therefore, the "A"-phase signal and the "B"-phase signal used for calibration include most of the eleventh and the thirteenth harmonic components. Accordingly, when the eleventh and the thirteenth harmonic components are attenuated according to increase of a rotation speed of the rotor body 2, an obtained output waveform deforms from that at the time of calibration and, as a result, a detection error is increased.

On the other hand, in this embodiment, in order to maintain stable detection accuracy without regard to a rotation speed of the rotor body, the control part 70 is provided with a function in which a signal component nonlinearly decreasing according to increase of a rotation speed is compensated to correct an output signal from the third magnetic sensor part 60. Specifically, the control part 70 stores parameters regarding respective harmonic components of an "A"-phase signal and a "B"-phase signal from the third magnetic sensor part 60 at a reference rotation speed, and data indicating a relationship between a change rate of a rotation speed (ratio between the reference rotation speed and a rotation speed of the rotor body 2) and a change rate of the parameter. In addition, based on the ratio of a current rotation speed to the reference rotation speed and the data, the stored parameter is converted to a value corresponding to the current rotation speed and the "A"-phase signal and the "B"-phase signal are corrected based on the converted value. When the harmonic components nonlinearly decreasing according to increase of the rotation speed are compensated as described above, a substantially constant output signal without regard to a rotation speed can be obtained and a high degree of detection accuracy can be maintained.

Next, a functional structure of the control part 70 will be described below by mainly paying attention to the correction processing function with reference to FIG. 3B.

Similarly to the first embodiment, the control part 70 includes an A/D conversion section (ADC) 71, an angle calculation section 720 and a correction processing section 730. The correction processing section 730 includes a storage section 740, a communication period measuring section 75 and a rotational speed calculation section 76.

The ADC 71 converts analog signals outputted from the first through the third magnetic sensor parts 40, 50 and 60 into digital signals to output to the angle calculation section 720 and the correction processing section 730. The angle calculation section 720 calculates a rotation position of the rotor body 2 described above based on the output signals from the first through the third magnetic sensor parts 40, 50 and 60 which are converted into digital signals in the ADC 71. In this case, the angle calculation section 720 acquires correction information from the correction processing section 730 for compensating signal components which are respectively decreased in an "A"-phase signal and a "B"-phase signal of the third magnetic sensor part 60. Next, the angle calculation section 720 corrects the output signals based on the acquired correction information and calculates a rotation position of the rotor body 2 by using the corrected output signals based on the calculation method described above.

The correction processing section 730 acquires from the storage section 740 the parameters regarding respective harmonic components of an "A"-phase signal and a "B"-phase signal at the reference rotation speed, and the data indicating a relationship between a change rate of a rotation speed (ratio between the reference rotation speed and a rotation speed of the rotor body 2) and a change rate of the parameter. Next, the correction processing section 730 converts the parameter into a value at the current rotation speed based on the data and the ratio of the current rotation speed calculated by the rotation speed calculation section 76 to the reference rotation speed.

The storage section 740 stores parameters regarding the harmonic components, specifically, respective amplitudes and phases of the eleventh and the thirteenth harmonic components of an "A"-phase signal and respective amplitudes and phases of the eleventh and the thirteenth harmonic components of a "B"-phase signal at the reference rotation speed. An amplitude of a harmonic component nonlinearly varies according to a rotation speed as described above, and a phase also nonlinearly varies according to a rotation speed, for example, corresponding to phase-frequency characteristics of the LPFs 80a through 80c. Therefore, the storage section 740 stores a relationship between a rotation speed of the rotor body 2 and the respective amplitudes, specifically, data (table or the like) indicating a relationship between a change rate of a rotation speed (ratio between the reference rotation speed and a rotation speed of the rotor body 2) and change rates of the respective amplitudes. Further, the storage section 740 also stores data (table or the like) indicating a relationship between a change rate of a rotation speed (ratio between the reference rotation speed and a rotation speed of the rotor body 2) and change rates of the respective phases. Therefore, when correction processing is to be performed, the amplitude and the phase at the reference rotation speed stored in the storage section 740 are converted into the amplitude and the phase at a current rotation speed in the correction processing section 730 based on the data of the respective change rates similarly stored in the storage section 740 and then the amplitude and the phase are sent to the angle calculation section 720. In the angle calculation section 720, a correction signal which compensates the attenuated signal component is created based on the amplitude and the phase converted in the correction processing section 73, and the output signal is corrected by adding the correction signal. Data regarding the change rates of the amplitude and the phase of harmonic components can be respectively obtained, for example, based on gain-frequency characteristics and phase-frequency characteristics of the LPFs 80a through 80c. In accordance with an embodiment of the present invention, in order to simplify the arithmetic processing, it may be structured that the phase of the harmonic components is assumed to be constant without regard to a rotation speed (in other words, assumed that the change rate is zero) to perform correction processing.

The communication period measuring section 75 measures a communication period between a host control device (not shown) provided in an outside of the rotary encoder 10 and the control part 70. For example, the control part 70 is structured to calculate a rotation speed of the rotor body 2 when a requirement signal from the host control device is received. In this case, the communication period measuring section 75 measures a time when the control part 70 receives the requirement signal and measures a reception interval of the requirement signal from the time.

The rotational speed calculation section 76 calculates a rotation displacement amount of the rotor body 2 in a predetermined time interval based on the reception interval measured by the communication period measuring section 75 and information of the rotation position of the rotor body 2 acquired from the angle calculation section 720 and then calculates the current rotation speed of the rotor body 2 by using the rotation displacement amount. Therefore, the rotation speed calculation section 76 measures a period at which the control part 70 actually calculates a rotation position and thus, even when an actual communication period is varied, an accurate rotation speed can be calculated and, as a result, the correction accuracy in the correction processing section 730 can be improved. In accordance with an embodiment of the present invention, since a period (receiving interval) at which the control part 70 receives a requirement signal from the host control device is set in advance, it may be structured that a rotation speed may be calculated by using a fixed setting value for simplifying a calculation processing as described in the above-mentioned Patent Literature.

Setting of the parameters stored in the storage section 740 are performed by using a rotary encoder 10 having been calibrated at a low speed (for example, 60 rpm) as described below before the rotary encoder 10 is shipped from a factory. First, a motor which is connected with a rotor body 2 is rotated at a constant rotation speed to output an "A"-phase signal and a "B"-phase signal. In this case, since the rotation speed is constant, when an output signal includes an error, ripples appear in the calculated rotation speed of the rotor body 2. However, when the output signal is ideal without having an error, ripples do not appear. Therefore, respective predetermined signal components are superposed on an "A"-phase signal and a "B"-phase signal including signal components which decrease according to a rotation speed to calculate a rotation speed of the rotor body 2 from the "A"-phase signal and the "B"-phase signal. Next, the amplitude and the phase of the signal component which is superposed so as to compensate the decreased signal component are adjusted to an optimum value to minimize a ripple of the calculated rotation speed. The amplitude and the phase obtained in this way are set as parameters.

Decreasing signal components can be easily obtained by this method without performing analysis processing such as frequency analysis. In at least an embodiment a rotation speed of the motor when parameters are to be set is an instantaneous maximum rotation speed (for example, 6000 rpm). As a result, the amplitude and the phase when the decreasing signal component to be compensated becomes maximum can be set as correction parameters and thus the output signal can be corrected with a high degree of resolution.

A magneto-sensitive element has temperature characteristics and thus, in a case that an output signal varies with temperature, an amplitude of a harmonic component also varies with temperature. Therefore, it may be structured that temperature change of the third magnetic sensor part 60 is monitored by a temperature detecting means and correction processing of a harmonic component may be performed based on the monitoring result. Alternatively, it may be structured that temperature of the third magnetic sensor part 60 is adjusted to be constant by using a temperature detecting means and a heating means.

In this embodiment, odd-order harmonic components except the eleventh and the thirteenth, for example, the third, the fifth and the seventh harmonic components are canceled by a well-known method, for example, a wiring pattern is adjusted. In other words, the "A"-phase sensor 60A and the "B"-phase sensor 60B of the third magnetic sensor part 60 are respectively structured so as to output an "A"-phase signal and a "B"-phase signal in which the third, the fifth and the seventh harmonic components are canceled. As a result, the correction processing is applied to only the eleventh and the thirteenth harmonic components and is not required to be applied to the third, the fifth and the seventh harmonic components and thus arithmetic processing can be simplified.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rotary encoder structured to detect a rotation position of a rotor body to a fixed body, the rotary encoder comprising:
   a magnet which is provided in one of the fixed body and the rotor body;
   a magnetic sensor part which is provided in the other of the fixed body and the rotor body and is structured to detect a magnetic field change of the magnet, the magnetic sensor part comprising:
      a first magneto-sensitive element which is disposed so as to face a magnetized face of the magnet and is structured to output an "A"-phase signal in a sine wave shape accompanied with rotation of the rotor body; and
      a second magneto-sensitive element which is disposed so as to face the magnetized face of the magnet and is structured to output a "B"-phase signal n a sine wave shape having a phase difference of 900 to the "A"-phase signal accompanied with rotation of the rotor body; and
   a control part which is structured to calculate a rotation position of the rotor body based on the "A"-phase signal and the "B"-phase signal at a timing when a requirement signal is received;
   wherein the control part comprises:
      a storage section configured to store a plurality of parameters regarding error signal components at a reference rotation speed, the error signal components respectively being superposed on the "A"-phase signal and the "B"-phase signal in proportion to a rotation speed of the rotor body; and
      a rotation speed calculation section which is structured to measure a reception interval of the requirement signal and to calculate a current rotation speed of the rotor body based on a rotation displacement amount of the rotor body for a measured reception interval; and
   wherein the control part is structured so that:
      at least one of the plurality of parameters stored in the storage sections converted to a value at the current rotation speed based on a ratio between the reference rotation speed and the current rotation speed calculated in the rotation speed calculation section;
      correction processing correcting the "A"-phase signal and the "B"-phase signal is executed based on the value converted; and
      the rotation position of the rotor body is calculated by using a corrected "A"-phase signal and a corrected "B"-phase signal.

2. The rotary encoder according to claim 1, wherein the error signal component is an induced voltage signal generated in the magnetic sensor part accompanied with rotation of the rotor body, and
   the plurality of the parameters comprises an amplitude and a phase of the induced voltage signal.

3. The rotary encoder according to claim 2, wherein the control part converts only the amplitude of the induced voltage signal of the parameters to a value at the current rotation speed, and
   the control part creates a correction signal which cancels the induced voltage signal based on a converted amplitude and the phase stored in the storage section.

4. The rotary encoder according to claim 2, wherein the control part converts both of the amplitude and the phase of the parameters to values at the current rotation speed, and
   the control part creates a correction signal which cancels the induced voltage signal based on a converted amplitude and a converted phase.

5. The rotary encoder according to claim 2, wherein the rotor body is rotated at a constant rotation speed as the reference rotation speed and, when a predetermined signal component is subtracted from the "A"-phase signal and the "B"-phase signal to calculate a rotation speed of the rotor body, the amplitude and the phase are set to be those of the predetermined signal component by which a ripple of a calculated rotation speed is minimized.

6. The rotary encoder according to claim 5, wherein the reference rotation speed is an instantaneous maximum rotation speed of a motor which is connected with the rotor body.

7. The rotary encoder according to claim 1, wherein the magnet comprises a plurality of magnets,
   the magnetic sensor part comprises a plurality of magnetic sensor parts, the control part calculates a rotation position of the rotor body based on a plurality of the "A"-phase signals and a plurality of the "B"-phase signals from the plurality of the magnetic sensor parts and executes correction processing for the plurality of the magnetic sensor parts.

8. The rotary encoder according to claim 7, wherein the plurality of the magnets comprises a first magnet in which one "N"-pole and one "S"-pole are disposed in a circumferential direction of the rotor body, and a second magnet in which a plurality of "N"-poles and a plurality of "S"-poles are alternately disposed in the circumferential direction of the rotor body,
the plurality of the magnetic sensor parts comprises at least one magnetic sensor part which faces the first magnet and a magnetic sensor part which faces the second magnet.

9. The rotary encoder according to claim 8, wherein the error signal component is an induced voltage signal generated in the magnetic sensor part accompanied with rotation of the rotor body, and
the plurality of the parameters comprises an amplitude and a phase of the induced voltage signal.

10. The rotary encoder according to claim 9, wherein the control part converts only the amplitude of the induced voltage signal to a value at the current rotation speed in the plurality of the parameters, and
the control part creates a correction signal which cancels the induced voltage signal based on a converted amplitude and the phase stored in the storage section.

11. The rotary encoder according to claim 9, wherein the control part converts both of the amplitude and the phase to values at the current rotation speed in the plurality of the parameters, and
the control part creates a correction signal which cancels the induced voltage signal based on a converted amplitude and a converted phase.

12. The rotary encoder according to claim 9, wherein when the rotor body is rotated at a constant rotation speed as the reference rotation speed and a predetermined signal component is subtracted from the "A"-phase signal and the "B"-phase signal to calculate a rotation speed of the rotor body, the amplitude and the phase are set to be those of the predetermined signal component by which a ripple of a calculated rotation speed is minimized.

13. The rotary encoder according to claim 1, wherein each of the magneto-sensitive elements comprises a magneto-resistance effect element.

14. A rotary encoder structured to detect a rotation position of a rotor body to a fixed body, the rotary encoder comprising:
a magnet which is provided in one of the fixed body and the rotor body;
a magnetic sensor part which is provided in the other of the fixed body and the rotor body and is structured to detect a magnetic field change of the magnet, the magnetic sensor part comprising:
a first magneto-sensitive element which is disposed so as to face a magnetized face of the magnet and is structured to output an "A"-phase signal in a sine wave shape accompanied with rotation of the rotor body; and
a second magneto-sensitive element which is disposed so as to face the magnetized face of the magnet and is structured to output a "B"-phase signal in a sine wave shape having a phase difference of 90° to the "A"-phase signal accompanied with rotation of the rotor body; and
a control part which is structured to calculate a rotation position of the rotor body based on the "A"-phase signal and the "B"-phase signal;
wherein the control part comprises:
a storage section configured to store:
a plurality of parameters regarding signal components at a reference rotation speed, the signal components being nonlinearly decreased in the signal components respectively included in the "A"-phase signal and the "B"-phase signal according to increase of a rotation speed of the rotor body; and
data which indicate a relationship between a ratio of a rotation speed of the rotor body to the reference rotation speed and a change rate of the plurality of the parameters; and
a rotation speed calculation section structured to calculate a current rotation speed of the rotor body;
wherein the control part is configured to convert at least one of the plurality of the parameters stored in the storage section to a value at the current rotation speed based on the ratio of the current rotation speed calculated in the rotation angle calculation section to the reference rotation speed and the change rate of the plurality of the parameters; and
wherein the control part is configured to execute correction processing which corrects the "A"-phase signal and the "B"-phase signal by compensating a decreased signal component based on the value converted and calculates a rotation position of the rotor body by using a corrected "A"-phase signal and a corrected "B"-phase signal.

15. The rotary encoder according to claim 14, wherein the decreased signal component is harmonic components of the "A"-phase signal and the "B"-phase signal, and the plurality of the parameters comprises an amplitude and a phase of the harmonic component.

16. The rotary encoder according to claim 15, wherein the control part is configured to convert both of the amplitude and the phase as the plurality of the parameters to values of the current rotation speed, and
the decreased signal component is compensated based on a converted amplitude and a converted phase.

17. The rotary encoder according to claim 15, wherein the rotor body is rotated at a constant rotation speed as the reference rotation speed and, when the rotation speed of the rotor body is calculated by respectively superposing a predetermined signal component on the "A"-phase signal and the "B"-phase signal, the amplitude and phase are set to be those of the predetermined signal component when a ripple of a calculated rotation speed is minimized.

18. The rotary encoder according to claim 17, wherein the reference rotation speed is an instantaneous maximum rotation speed of a motor which is connected with the rotor body.

19. The rotary encoder according to claim 17, wherein the amplitude and the phase are calculated by the rotary encoder which is calibrated when the rotor body is rotated at a lower speed than the reference rotation speed.

20. The rotary encoder according to claim 15, wherein the harmonic component is an eleventh and a thirteenth harmonic components.

21. The rotary encoder according to claim 20, wherein each of the magneto-sensitive elements is structured to output the "A"-phase signal and the "B"-phase signal in which a third, a fifth and a seventh harmonic components are canceled.

22. The rotary encoder according to claim 14, wherein a low-pass filter is provided between the magnetic sensor part and the control part.

23. The rotary encoder according to claim 22, wherein
the decreased signal component comprises harmonic components of the "A"-phase signal and the "B"-phase signal, and
the plurality of the parameters comprises an amplitude and a phase of the harmonic component.

24. The rotary encoder according to claim 23, wherein
the control part converts both of the amplitude and the phase as the plurality of the parameters to values of the current rotation speed, and
the decreased signal component is compensated based on a converted amplitude and a converted phase.

25. The rotary encoder according to claim 14, wherein
the control part calculates the rotation position of the rotor body when the control part receives a requirement signal,
the rotation speed calculation section measures a reception interval of the requirement signal and calculates a current rotation speed of the rotor body based on a rotation displacement amount of the rotor body for a measured reception interval.

26. The rotary encoder according to claim 14, wherein
the control part calculates the rotation position of the rotor body when the control part receives a requirement signal, and
the rotation speed calculation section calculates a current rotation speed of the rotor body based on a rotation displacement amount of the rotor body for a reception interval of the requirement signal previously set.

27. The rotary encoder according to claim 14, wherein
the magnet comprises a plurality of magnets,
the magnetic sensor part comprises a plurality of magnetic sensor parts,
the plurality of the magnets comprises a first magnet in which one "N"-pole and one "S"-pole are disposed in a circumferential direction of the rotor body, and a second magnet in which a plurality of "N"-poles and a plurality of "S"-poles are alternately disposed in the circumferential direction of the rotor body,
the plurality of the magnetic sensor parts comprises at least one magnetic sensor part which faces the first magnet, and a magnetic sensor part which faces the second magnet, and
the control part is configured to calculate a rotation position of the rotor body based on a plurality of the "A"-phase signals and a plurality of the "B"-phase signals from the plurality of the magnetic sensor parts and executes correction processing for the magnetic sensor part corresponding to the second magnet.

28. The rotary encoder according to claim 27, wherein
the plurality of the magnetic sensor parts comprise a first magnetic sensor part and a second magnetic sensor part which are structured to detect a magnetic field change of the first magnet and a third magnetic sensor part structured to detect a magnetic field change of the second magnet,
the decreased signal component comprises harmonic components of the "A"-phase signal and the "B"-phase signal which are outputted from the third magnetic sensor part, and
the plurality of the parameters comprises an amplitude and a phase of the harmonic component.

29. The rotary encoder according to claim 14, wherein each of the magneto-sensitive elements comprises a magneto-resistance effect element.

* * * * *